United States Patent
Han

(10) Patent No.: US 8,515,404 B2
(45) Date of Patent: Aug. 20, 2013

(54) MOBILE TERMINAL AND CONTROLLING METHOD THEREOF

(75) Inventor: Ju Hyun Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/025,913

(22) Filed: Feb. 11, 2011

(65) Prior Publication Data

US 2012/0015694 A1    Jan. 19, 2012

(30) Foreign Application Priority Data

Jul. 13, 2010  (KR) .................. 10-2010-0067275

(51) Int. Cl.
| | | |
|---|---|---|
| H04L 29/08 | (2006.01) | |
| H04M 3/42 | (2006.01) | |
| H04M 1/00 | (2006.01) | |
| H04M 3/00 | (2006.01) | |
| H04B 1/38 | (2006.01) | |
| G09G 5/00 | (2006.01) | |

(52) U.S. Cl.
USPC ..... 455/414.4; 455/566; 455/418; 455/414.1; 345/581; 345/619; 345/660; 345/666; 345/681

(58) Field of Classification Search
USPC .......... 455/566, 418, 414.1, 414.4; 345/660, 345/581, 666, 681, 619
See application file for complete search history.

(56) References Cited

U.S. PATENT DOCUMENTS

| | | | | |
|---|---|---|---|---|
| 6,704,034 | B1 * | 3/2004 | Rodriguez et al. ............ | 715/860 |
| 2004/0252887 | A1 * | 12/2004 | Lim et al. ...................... | 382/182 |
| 2005/0156946 | A1 * | 7/2005 | Nakano ......................... | 345/619 |
| 2006/0288278 | A1 * | 12/2006 | Kobayashi .................... | 715/523 |
| 2007/0090190 | A1 * | 4/2007 | Kuromatsu et al. ........... | 235/454 |
| 2007/0211080 | A1 * | 9/2007 | Adams et al. ................. | 345/619 |
| 2007/0279437 | A1 * | 12/2007 | Morimoto ..................... | 345/629 |
| 2009/0189920 | A1 | 7/2009 | Chiu et al. | |
| 2009/0303253 | A1 | 12/2009 | Flake et al. | |
| 2009/0303254 | A1 * | 12/2009 | Broms .......................... | 345/660 |
| 2010/0073398 | A1 * | 3/2010 | Fisher et al. .................. | 345/619 |
| 2011/0148932 | A1 * | 6/2011 | Niemi et al. .................. | 345/660 |

FOREIGN PATENT DOCUMENTS

| | | |
|---|---|---|
| CN | 1689068 A | 10/2005 |
| CN | 101025909 A | 8/2007 |
| EP | 2172836 | 4/2010 |

OTHER PUBLICATIONS

European Search Report dated Dec. 13, 2011.
Chinese Office Action dated Apr. 2, 2013 issued in Application No. 201110038681.7 (with English translation).

* cited by examiner

*Primary Examiner* — Vladimir Magloire
*Assistant Examiner* — Michael Mapa
(74) *Attorney, Agent, or Firm* — KED & Associates LLP

(57) ABSTRACT

A mobile terminal having a controller to extract and display content within a region specified on a screen of the terminal. The displayed content occupies a highest rate among a plurality of contents in a region specified on the screen. The region may be taken from a displayed website or other screen containing text, image, animation, hyperlinks or other content.

21 Claims, 26 Drawing Sheets

(a)

(b)

(a)

(b)

(a)

(b)

(a) (b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL AND CONTROLLING METHOD THEREOF

RELATED APPLICATIONS

Pursuant to 35 U.S.C. §119(a), this application claims the benefit of earlier filing date and right of priority to Korean Application No. 10-2010-0067275, filed on Jul. 13, 2010, the contents of which are hereby incorporated by reference herein in their entirety.

BACKGROUND

1. Field

One or more embodiments described herein relate to a mobile terminal.

2. Background

Mobile terminals are now designed to perform web-browsing functions that include displaying images from a user-specified web site. However, because of the limited screen size on these terminals, images often cannot be displayed in their entirety and the same is true of websites in general. As a result, only a part of an image or website can be displayed, which is inconvenient to the user.

DETAILED DESCRIPTION

One or more embodiments described herein can be applied to a various types of terminals, examples of which include mobile as well as stationary terminals such as mobile phones, user equipment (UE), smart phones, DTV, computers, digital broadcast terminals, personal digital assistants, portable multimedia players (PMP) and navigators to name a few. By way of non-limiting example, these embodiments will be described with regard to a mobile terminal.

Figure 1:
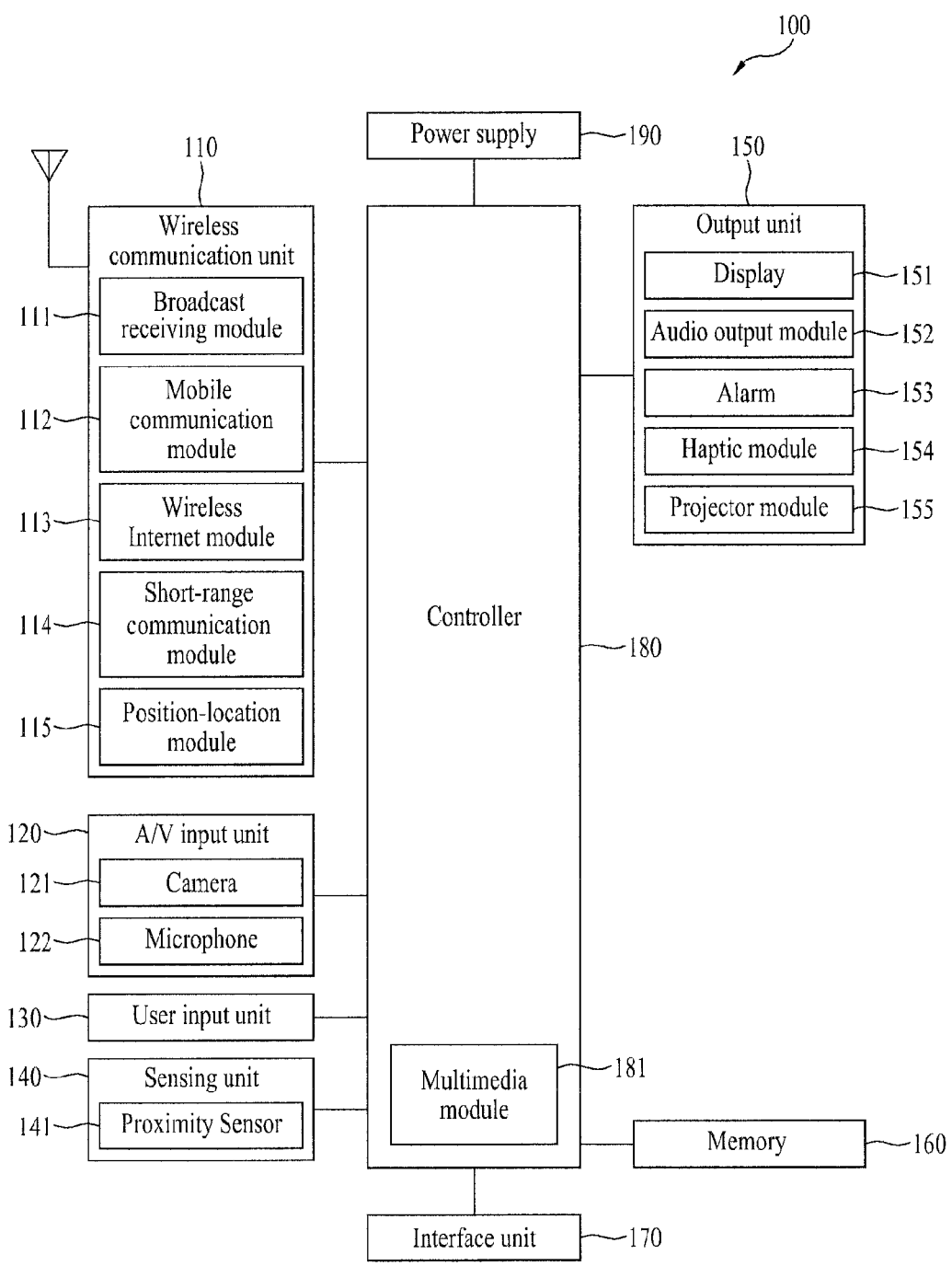
FIG. 1 is a diagram of one embodiment of a mobile terminal.

FIG. 1 shows one embodiment of a mobile terminal 100 which includes a wireless communication unit 110, an A/V (audio/video) input unit 120, a user input unit 130, a sensing unit 140, an output unit 150, a memory 160, an interface unit 170, a controller 180, and a power supply unit 190.

The wireless communication unit 110 includes one or more components which permit wireless communication to take place between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, and a position-location module 115.

The broadcast receiving module 111 receives a broadcast signal and/or broadcast associated information from an external broadcast managing server via a broadcast channel, which may be a satellite channel or a terrestrial channel.

The broadcast managing server may generate and transmit broadcast signals and/or broadcast associated information. Additionally, or alternatively, this server be one provided with one or more previously generated broadcast signals and/or broadcast associated information which is then transmitted, for example, to another terminal or receiver. The broadcast signals may be TV broadcast signals, radio broadcast signals, and/or data broadcast signals among others.

According to one embodiment, the broadcast signals may be combined with one or more TV or radio broadcast signals to form a combined signal. According to this or another embodiment, the mobile terminal may include two or more broadcast receiving modules 111 to allow for simultaneous reception of multiple broadcast channels and/or to allow for broadcast channel switching facilitation.

The broadcast associated information may include one or more of information associated with a broadcast channel, a broadcast program, or a broadcast service provider. The broadcast associated information may be provided via a mobile communication network and received by the mobile communication module 112.

The broadcast associated information can be implemented in various forms. For instance, the broadcast associated information may include an electronic program guide (EPG) of digital multimedia broadcasting (DMB) and/or electronic service guide (ESG) of digital video broadcast-handheld (DVB-H).

The broadcast receiving module 111 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 may be configured to be suitable for other broadcasting systems as well as the aforementioned digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may include audio, video, and/or data relating to or otherwise based on text/multimedia messages.

The wireless internet module 113 supports Internet access for the mobile terminal 100. This module may be internally or externally coupled to the mobile terminal 100. In this case, the wireless Internet technology may include, for example, WLAN (Wireless LAN) (Wi-Fi), Wibro (Wireless broadband), Wimax (World Interoperability for Microwave Access), or HSDPA (High Speed Downlink Packet Access).

The short-range communication module 114 facilitates relatively short-range communications. Suitable technologies for implementing this module include radio frequency identification (RFID), infrared data association (IrDA), and ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 may include one or more cameras 121 and a microphone 122.

The camera(s) 121 may possess a digital zoom and may process image frames of still pictures or video, obtained by an image sensor in a video call mode or a photographing mode. The processed image frames are displayed on the display 151.

The image frames processed by the camera(s) 121 can be stored in the memory 160 or can be externally transmitted via the wireless communication unit 110. According to one embodiment, at least two cameras 121 can be provided to the mobile terminal 100 according, for example, to the usage environment.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, and/or orientation or acceleration/deceleration of the mobile terminal 100.

As an example, consider the illustrative case where mobile terminal 100 is configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to, for example, a sense of sight, hearing, and/or touch. And, the output unit 150 may includes the display 151, an audio output module 152, an alarm unit 153, a haptic module 154, and a projector module 155 as well as other features.

The display 151 may be implemented to visually display (output) information associated with the mobile terminal 100. For instance, if the mobile terminal is operating in phone call mode, the display may operate as a user interface (UI) or graphical user interface (GUI) which includes information associated with placing, conducting, and terminating a phone call. As another example, if the mobile terminal 100 is in video call mode or photographing mode, the display 151 may additionally or alternatively display images associated with these modes, the UI, or the GUI.

The display module 151 may be implemented using known display technologies including, for example, a liquid crystal display (LCD), a thin film transistor-liquid crystal display (TFT-LCD), an organic light-emitting diode display (OLED), a flexible display, or a three-dimensional display. According to one embodiment, the mobile terminal 100 may include one or more of such displays.

Some of the above displays may be implemented as a transparent or optical transmissive-type, i.e., as a transparent display. An example of a transparent display includes TOLED (transparent OLED). A rear configuration of display 151 may be implemented in the optical transmissive type as well. In this configuration, a user is able to see an object in rear of a terminal body via the area occupied by the display 151 of the terminal body.

In one embodiment, two or more displays 151 may be provided. These displays, for instance, may be arranged on a single face of the mobile terminal 100 in a spaced-apart configuration or may be built into one body. Alternatively, the displays may be arranged on different faces of the mobile terminal 100.

In the same or another embodiment, display 151 and a sensor for detecting a touch action (hereinafter called 'touch sensor') may be combined to form a multi-layer structure known as a touch screen. When configured in this manner, display 151 may be used as an input device as well as an output device. The touch sensor may be configured as a touch film, a touch sheet, a touchpad or the like.

The touch sensor may be configured to convert a pressure applied to a specific portion of the display 151, or a variation of a capacitance generated from a specific portion of the display 151, into an electric input signal. Moreover, the touch sensor may be configured to detect the pressure of a touch as well as a touched position or size/amount.

If a touch input is sensed by the touch sensor, one or more signals corresponding to the touch are transferred to a touch controller. The touch controller processes the signals and then transfers the processed signals to the controller 180. The controller, therefore, is able to determine whether a prescribed portion of the display 151 has been touched.

Referring to FIG. 1, a proximity sensor may be provided at an internal area of the mobile terminal 100 enclosed by the touchscreen or around the touchscreen. The proximity sensor is a sensor that detects the presence or absence of an object approaching a prescribed detecting surface or an object existing around the proximity sensor using an electromagnetic field strength or infrared ray without mechanical contact. Such a proximity sensor is expected to have a durability longer than that of a contact-type sensor and also may be more useful than a contact-type sensor.

The proximity sensor may include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. In case that the touch screen includes an electrostatic capacity proximity sensor, the sensor may be configured to detect the proximity of a pointer using a variation of electric field according to the proximity of the pointer. In this case, the touch screen (touch sensor) may be classified as the proximity sensor.

A proximity touch will now be more described in greater detail. A proximity touch may be understood to correspond to the action of a pointer that approaches the touch screen without contacting the touch screen. In contrast, a contact touch may be understood to correspond to an action where a pointer actually touches the touch screen. The position on the touch screen that is proximity-touched by the pointer may correspond to the position of the pointer which vertically or otherwise opposes the touch screen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern may be output to the touch screen.

The audio output module 152 may function in various modes including one or more of call-receiving mode, call-placing mode, recording mode, voice recognition mode, and broadcast reception mode to output audio data received from the wireless communication unit 110 or stored in memory 160. During operation, audio output module 152 outputs audio relating to a particular function (e.g., call received, message received, etc.). The audio output module 152 is often implemented using one or more speakers, buzzers, other audio producing devices, and combinations thereof.

The alarm unit 153 may output a signal for announcing the occurrence of a particular event associated with the mobile terminal 100. These events may include, for example, a call received event, a message received event and a touch input received event. The alarm unit 153 may also output a signal for announcing the event occurrence by way of vibration as well as video or audio signal. The video or audio signal may be outputted via the display 151 or the audio output unit 152. Hence, the display 151 or the audio output module 152 may be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to a skim over a skin surface, an effect attributed to contact with an electrode, an effect attributed to electrostatic force, and/or an effect attributed to the representation of hold/cold sense using an endothermic or exothermic device.

The haptic module 154 may be implemented to enable a user to sense a tactile effect through a muscle sense of a finger or arm or the like, as well as to transfer a tactile effect through direct contact. According to one embodiment, the mobile terminal may include two or more haptic modules 154 based, for example, on the type and/or configuration of the terminal.

The projector module 155 may perform an image projector function using the mobile terminal 100. The projector module 155 may display an image identical to or partially different from the image displayed on the display 151 on an external screen or wall according to a control signal of the controller 180.

For example, projector module 155 may include a light source (e.g., laser), an image producing device for producing an image to output externally based on the light generated from the light source, and a lens for enlarging the image to be externally output at a predetermined focus distance. The projector module 155 may also include a device for adjusting an image-projecting direction by, for example, mechanically moving the lens and/or the whole module.

The projector module 155 may be, for example, a CRT (cathode ray tube) module, LCD (liquid crystal display) module, or DLP (digital light processing) module. If a DLP module, the module may be operated by a mechanism which enables light generated from the light source to reflect on a DMD (digital micro-mirror device) chip. This may be advantageous for downsizing of the projector module 151.

The projector module 155 may be provided, for example, in a length direction of a lateral, front or backside of the mobile terminal 100. However, it is understood that the projector module 155 may be provided to any portion of the mobile terminal 100.

The memory unit 160 stores various types of data to support the processing, control, and storage requirements of the mobile terminal 100. Examples of such data include program instructions for applications operating on the mobile terminal 100, contact data, phonebook data, messages, audio, still pictures, and moving pictures. Also, recent use history or cumulative use frequency of each data (e.g., use frequency for each phonebook, each message or each multimedia) may be stored in the memory unit 160. Also, data for various patterns of vibration and/or sound outputted in case of a touch input to the touch screen may be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. Also, the mobile terminal 100 may operate in association with a web storage for performing a storage function of the memory 160 on Internet.

The interface unit 170 may be implemented to couple the mobile terminal 100 with one or more external devices. In this regard, the interface unit 170 may receive data from the external devices or may be supplied with power and then transfer the data or power to respective elements of the mobile terminal 100, or may allow data within the mobile terminal 100 to be transferred to the external devices. The interface unit 170 may be configured using, for example, a wired/wireless headset port, an external charger port, a wired/wireless data port, a memory card port, a port for coupling to a device having an identity module, audio input/output ports, video input/output ports, an earphone port and/or the like.

The identity module may be a chip designed to store various kinds of information for authenticating a use authority of the mobile terminal 100. Such a module may include a User Identify Module (UIM), Subscriber Identify Module (SIM), and/or Universal Subscriber Identity Module (USIM). A device having the identity module (hereinafter called an 'identity device') may be manufactured, for example, as a smart card. The identity device may be connected to the mobile terminal 100 via a corresponding port.

When the mobile terminal 110 is connected to an external cradle, the interface unit 170 may serve as a passage for supplying the mobile terminal 100 with power from the cradle and/or as a passage for delivering command signals input from the cradle by a user to the mobile terminal 100. Each command signal input from the cradle or power may operate as a signal enabling the mobile terminal 100 to recognize that it is correctly loaded in the cradle.

The controller 180 may control the overall operation of mobile terminal 100. For example, controller 180 may control and process information associated with voice calls, data communications, and video calls. The controller 180 may include a multimedia module 181 that performs multimedia playback. The multimedia module 181 may be configured as part of the controller 180 or may be implemented as a separate component. The controller 180 may also perform a pattern recognizing process for recognizing a writing input and a picture drawing input carried out on the touch screen as characters or images, respectively.

The power supply unit 190 provides power for various components of the mobile terminal 100. The power may be internal power, external power, or a combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules such as procedures and functions, each of which performs one or more of the functions and operations described herein. The software code may be implemented with a software application written in any suitable programming language and may be stored in memory such as the memory 160, and executed by a controller or processor, such as the controller 180.

Figure 2A:
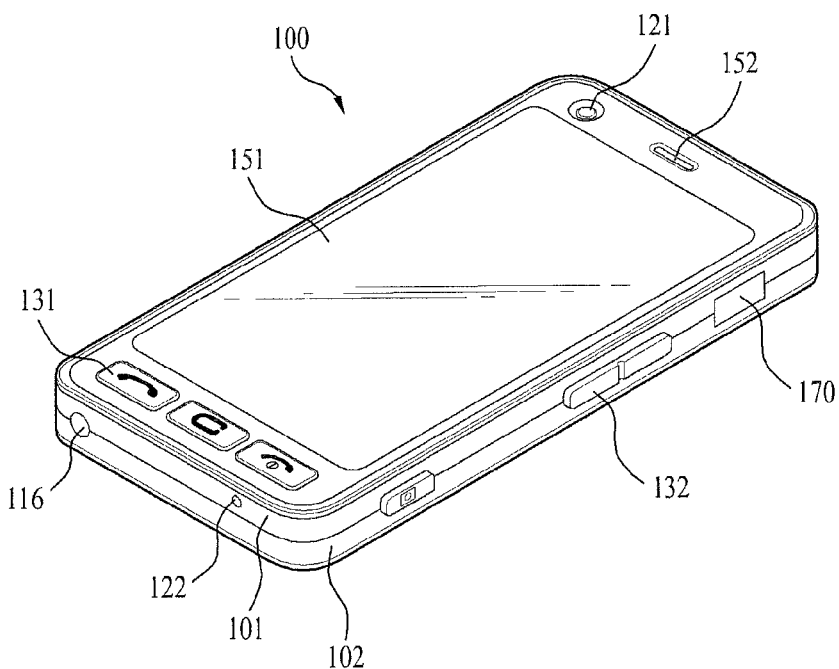
FIGS. 2A and 2B are front and rear views of the first embodiment of the mobile terminal.

FIG. 2A shows one embodiment of a mobile terminal having a bar-type body. In other embodiments, the terminal may have a folder-type, slide-type, rotational-type, or swing-type body or and a combination thereof.

The mobile terminal 100 includes a case (casing, housing, cover, etc.) including a front case 101 and a rear case 102. Various electronic parts are loaded in spaces provided between the front and rear cases 101 and 102. Optionally, at least one middle case may be further provided between the front and rear cases 101 and 102.

The cases 101 and 102 may be formed, for example, by injection molding of synthetic resin or may be formed of a metal substance such as stainless steel (STS) or titanium (Ti). Other metals may alternatively be used.

Display 151, audio output unit 152, camera 121, user input units 130/131 and 132, microphone 122, and interface 180 may be provided to the terminal body, and more particularly to the front case 101.

The display 151 may occupy most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100 and may include a plurality of manipulating units 131 and 132. The manipulating units 131 and 132 may be referred to as a manipulating portion and may adopt any mechanism of a tactile manner that enables a user to perform a manipulation action by experiencing a tactile feeling.

Content input by the first or second manipulating unit 131 or 132 can be diversely set. For instance, a command such as start, end, scroll or the like may be input into the first manipulating unit 131, and a command for a volume adjustment of sound output from the audio output unit 152, a command for switching to a touch recognizing mode of the display 151 or the like may be input into the second manipulating unit 132.

Figure 2B:
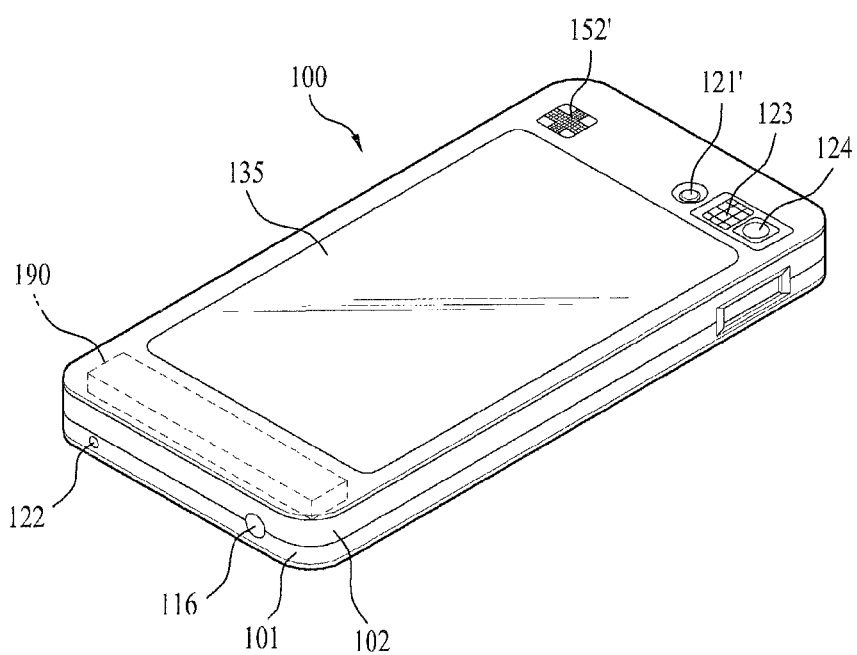

FIG. 2B shows a backside of the terminal shown in FIG. 2A. The backside may include a camera 121' provided on rear case 102. The camera 121 may have a photographing direction substantially opposite to that of camera 121 in FIG. 2A and may have a pixel resolution different from camera 121.

For example, camera 121 may have a low pixel resolution sufficient to capture and transmit a picture of user's face for a video call, while camera 121' may have a higher resolution for capturing a general subject for photography without transmitting the captured subject, or vice versa. Each camera 121 and 121' may be installed at the terminal body so that it can rotate or pop up.

A flash 123 and mirror 124 may be provided adjacent camera 121'. The flash 123 projects light towards a subject in case of photographing the subject using the camera 121'. If a user wants to take a picture of himself (self-photography) using camera 121', mirror 124 may enable the user to view his face.

An additional audio output unit 152' may be provided on the backside of the terminal body. The additional audio output unit 152' may implement a stereo function when taken with the audio output unit 152 shown in FIG. 2A, and may be used to implement a speakerphone mode in talking over the terminal.

A broadcast signal receiving antenna 124 may be provided on a lateral side of the terminal body as well as a communication antenna. The antenna 124 may be coupled to broadcast receiving module 111 in FIG. 1 and may be retractable relative to the terminal body.

A power supply unit 190 for supplying a power to the terminal 100 is provided to the terminal body. The power supply unit 190 may be configured to be built within the terminal body, or may be detachably connected to the terminal body.

A touchpad 135 for detecting a touch may be provided on rear case 102. The touchpad 135 may be a light-transmissive type like display 151. In this case, if the display 151 is configured to output visual information from its both faces, it is able to recognize visual information via touchpad 135 as well. The information output from both faces may be entirely controlled by touchpad 135. Alternatively, a display may be provided to touchpad 135 so that a touch screen can be provided to the rear case 102.

The touchpad 135 may be activated by interconnecting with the display 151 of the front case 101. The touchpad 135 may be provided in on a rear side of the display 151 in parallel, and may have a size equal to or smaller than that of display 151.

In the following description, the embodiments are explained with reference to FIGS. 3 to 22. Initially, it is noted that the embodiments may display user-specified content by extracting the content, for example, from a picture, website, outgoing/incoming multimedia message (MMS), incoming/outgoing email, document, memo, or schedule that includes a plurality of the same or different types of content.

The content may include one or a combination of text, image, video, animation, URL (uniform resource locator), hyperlinks and the like within the picture.

Figure 3:
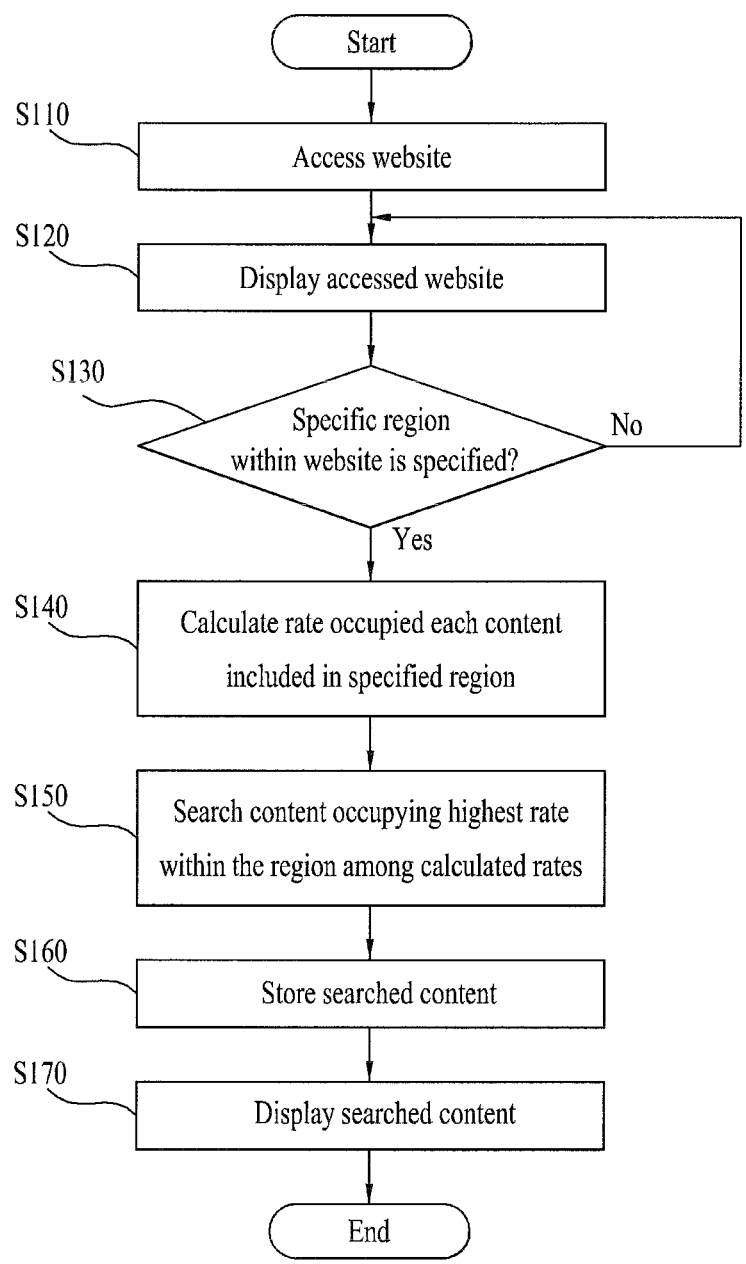
FIG. 3 is a diagram showing steps included in a one embodiment of a process for extracting and displaying user-specific content within a website picture.

FIG. 3 shows steps included in one embodiment of a method for extracting and displaying user-specified content from a website picture, and FIGS. 4 to 22 show screen configurations that may be generated in accordance with this method.

If a specific website 300 is selected via the user input unit 130 or the touchscreen 151, the controller 180 of the mobile terminal 100 controls the wireless communication unit 110 to access the selected website 300 [S110] and then displays a picture 300 of the accessed website on the touchscreen 151 [S120].

In this case, the website picture 300 can be zoomed in or out by a key manipulation of the user input unit 130 or a touch manipulation of the touchscreen 151.

While the website picture 300 is displayed, if a specific region 400 is specified via the user input unit 130 or the touchscreen 151 [S130], the controller 180 analyzes contents included in the specified region 400 within the website picture 300. The contents include a text, image video, animation, URL (uniform resource locator) and hyperlinks, all of which is included in website picture 300.

The controller 180 enables a user to specify the region 400 in website picture 300 via one of a direction key (or a navigation key), jog key, jog dial or the like.

Figure 4:
FIGS. 4 to 26 are diagrams showing examples of different screen configurations generated based on an embodiment of a process for extracting and displaying user-specific content within a web site picture.
Figure 4:

In particular, if a user shifts a cursor displayed within the website picture 300 to an outline of the region 400 to specify in a manner of manipulating up/down/left/right key of the direction key 130 [FIG. 4 (a)], controller 180 recognizes that region 400 within the outline, to which the cursor has been shifted, is specified and is then able to display the recognized region 400 within the website picture 300 in a distinguishable manner [FIG. 4 (b)].

In order to inform the user that region 400 has been specified, controller 180 displays the region 400 in a blinking manner or changes at least one of brightness or color saturation or performs some other visual distinction for region 400. Alternatively, the controller 180 may enable region 400 to be specified within the website picture 300 via the touch screen 151.

Figure 5:
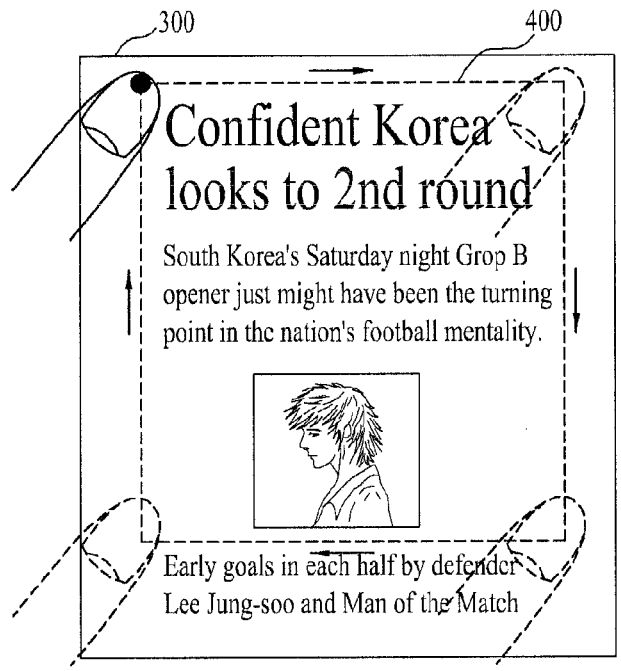
Figure 5:

If a user performs a touch & drag on an outline of a region 400 to specify within the website picture 300 [FIG. 5 (a)], the controller 180 recognizes that the region 400 within the outline touched & dragged by the user is specified and is then display the recognized region 400 within the website picture 300 in a distinguishable manner [FIG. 5 (b)].

If a user touches 4 corners of a region 400 to specify within the website picture 300, the controller 180 is able to recognize that the region 400 within the corners touched by the user is specified.

Figure 6:
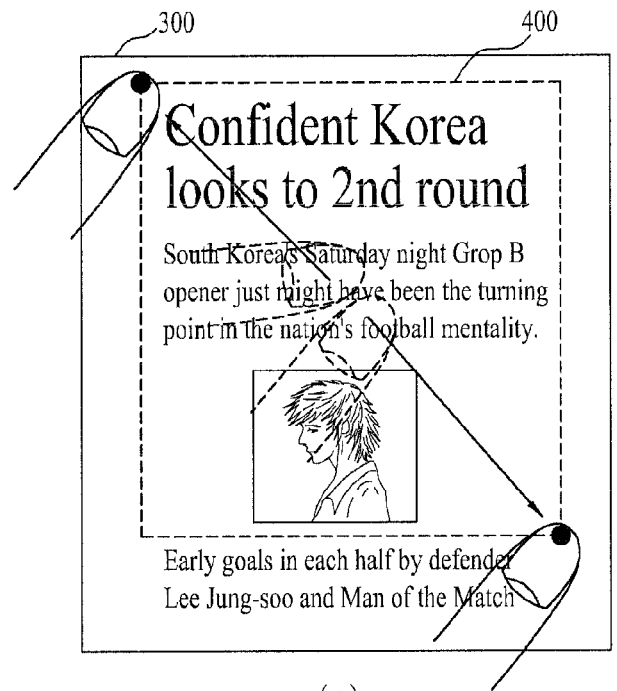
Figure 6:

If a user keeps multi-touching 2 specific points within a website picture 300 and then extends the multi-touched 2 points to a region 400 to specify [FIG. 6 (a)], the controller 180 recognizes that the multi-touched region 400 is specified and is then able to distinguishably display the recognized region 400 within the website picture 300 [FIG. 6 (b)].

Referring back to FIG. 3, the controller 180 calculates a rate occupied by each of the contents included within the specified region 400 [S140]. The calculated rate may include a display or data size rate occupied by each of the contents in the region 400. In the following description, the rate is assumed as the display rate, however another type of rate may be used in alternative embodiments.

In particular, the controller 180 may calculates the display rate occupied within the region 400 by each of the contents included in the region 400 and then searches for the content having a highest one of the calculated display rates [S150].

The controller 180 obtains a display location of the searched content within the region 400, extracts the obtained content from the region 400 based on the obtained display location of the corresponding content, and then enables the extracted content to be stored in the memory 160 [S160]. In doing so, the controller 180 is able to display the corresponding content by applying a font type and layout preset by the user thereto. Alternatively, the controller 180 may crop or capture the obtained content within the region 400 and then enable the corresponding content to be stored in the memory 160.

Afterwards, the controller 180 displays the extracted content on the touchscreen 151 [S170]. If the corresponding content is linked to specific website address information, the controller 180 enables the address information linked to the content, address information of the currently accessed website 300 and the corresponding content to be stored in the memory 160 in a manner of mapping them to one another.

In particular, when the user views the content, if the user needs confirmation on details of the content, the user is able to confirm or check the details by accessing the content link address mapped to the corresponding content or the website 300 mapped to the corresponding content.

Figure 7:
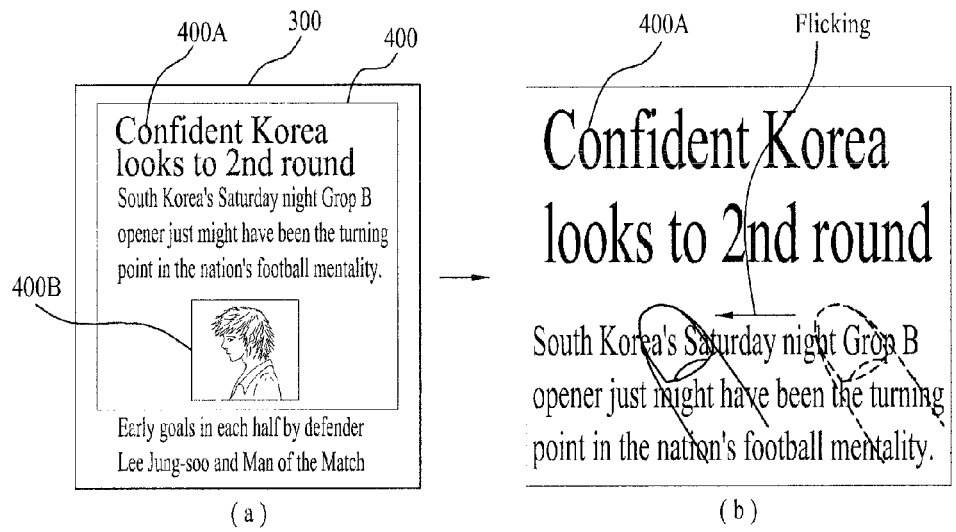
Figure 7:

Meanwhile, in case that the extracted content is displayed, as shown in FIG. 7, the controller 180 switches the website picture 300 to the display picture of the extracted content and is then able to zoom in and display the extracted content within the whole switched picture.

In particular, referring to FIG. 7 (a), if a specific region 400 is specified within the website picture 300 by a user, the controller 180 calculates a display rate of each of the contents included within the specified region 400 and then extracts a text content 400A occupying a highest display rate within the region 400 among the calculated display rates.

Subsequently, referring to FIG. 7 (b), the controller 180 switches the website picture 300 to the display picture of the corresponding content and then zooms in and displays the extracted text content 400A on the whole switched picture.

In this case, after the website picture 300 has been switched to the extracted content picture 400A, if a user's flicking touch is input into the content picture 400A [FIG. 7 (b)], the controller 180 is able to switch the content picture 400 back to the website picture 300 [FIG. 7 (c)]. In particular, according to the user's flicking touch, the website picture 300 and the extracted content picture 400A can be switched to each other.

Figure 8:
Figure 8:

Alternatively, the controller 180 is able to display the extracted content as a popup window on the website picture 300. As shown in FIG. 8 (a), if a specific region 400 is specified within the website picture 300 by a user, the controller 180 calculates a display rate of each of the contents included within the specified region 400 and then extracts a text content 400A occupying a highest display rate within the region 400 among the calculated display rates.

Subsequently, referring to FIG. 8 (b), the controller 180 displays the extracted text content 400A as a popup window on the website picture 300. If the popup window of the extracted text content 400A is displayed on the website picture 300, the controller 180 enables the text content 400A to be displayed transparently within the popup window to identify both of the website picture 300 and the popup window from each other. Moreover, like FIG. 7, according to the user's flicking touch, the website picture 300 and the popup window can be switched to each other.

Figure 9:
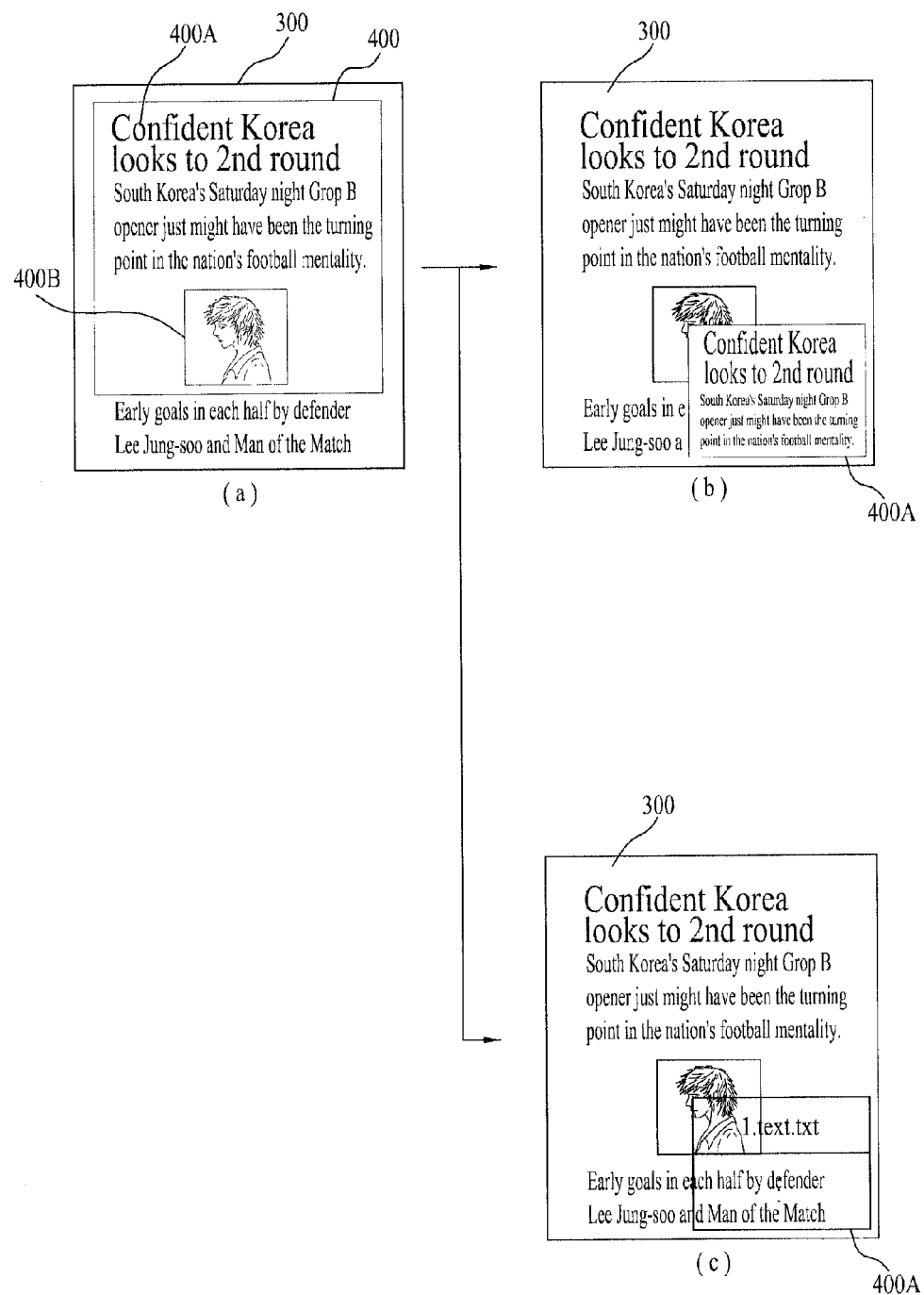

Referring to FIG. 9, the controller 180 extracts a content 400A occupying a highest display rate among contents 400A and 400B within the specified region 400 and then displays the extracted content 400A as a thumbnail or list on the website picture 300.

As shown in FIG. 9 (a), if a specific region 400 is specified within the website picture 300, the controller 180 extracts a text content 400A occupying a highest display rate among the contents 400A and 400B within the specified region 400. Subsequently, referring to FIG. 9 (b), the controller 180 is able to display the extracted text content 400A as a thumbnail image on the website picture 300.

Alternatively, referring to FIG. 9 (c), the controller 180 is able to display the extracted text content 400A as a list on the website picture 300.

Thus, each time content is extracted within the website picture 300, the controller 180 displays the extracted contents on the website picture 300 in a manner of sorting them as thumbnails or a list.

In doing so, if a thumbnail image displayed on the website picture 300 is selected or a specific content is selected from the list, the controller 180 zooms in and displays the selected content on a whole screen or is able to display the selected content as a popup window.

Figure 10:
Figure 10:
Figure 10:

Referring to FIG. 10, even if region 400 is not specified on the website picture 300, the controller 180 extracts and displays content having a highest display rate among all contents within the website picture 300 according to user's preset command. In particular, if a user's preset command is input while the web site picture 300 is displayed [FIG. 10 (a)], the controller 180 extracts and displays text content having a highest display rate within the website picture 300 [FIG. 10 (b)].

The preset command may include an input of a preset key among keys provided to the user input unit 130. Alternatively, or additionally, the preset command may include a touch gesture preset by a user or a motion gesture via a motion sensor.

Figure 11:
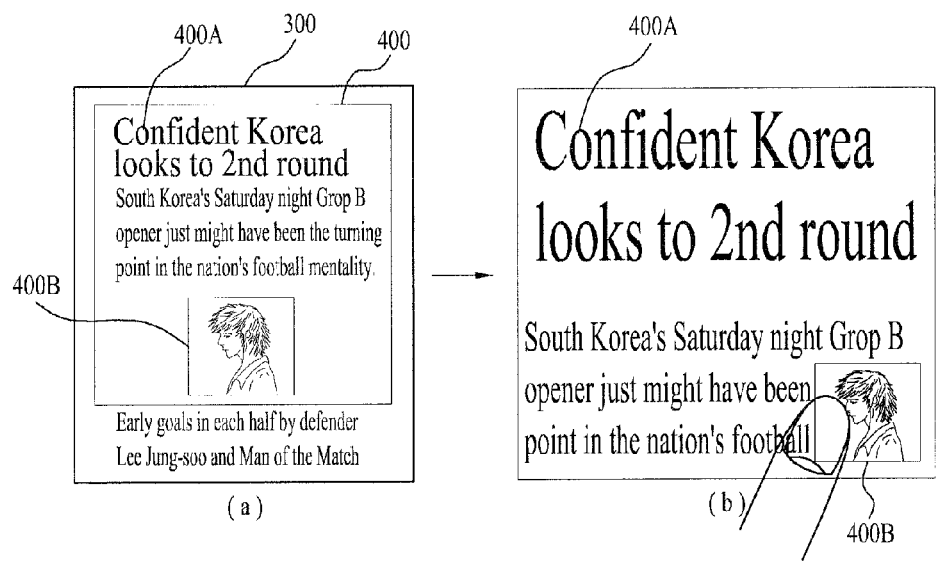
Figure 11:
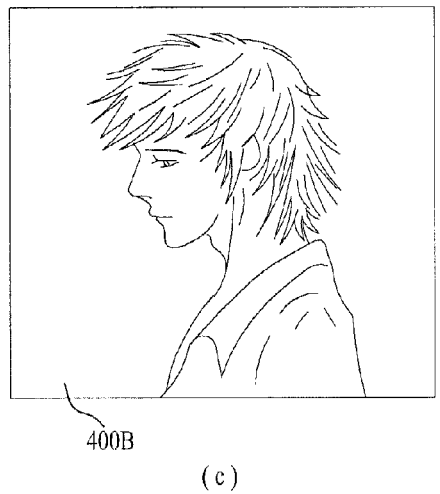

Referring to FIG. 11, the controller 180 extracts all contents within the region 400 and then displays the content having a highest display rate among the extracted contents. The extracted content may be displayed in a zoomed format on a whole screen or may be displayed in a popup window. The rest of the extracted contents may be displayed as thumbnails or a list within the displayed image of the content having the highest display rate.

In particular, referring to FIG. 11 (a), if the region 400 is specified within the website picture 300, the controller 180 extracts all contents 400A and 400B within the designated region 400. Subsequently, referring to FIG. 11 (b), the controller 180 displays the content 400A having a highest display rate among the extracted contents 400A and 400B in a manner of zooming in the corresponding content 400A on a whole screen or displaying the corresponding content 400A as a popup window.

And, referring to FIG. 11 (b), the controller 180 displays the other content (i.e., the image content 400B) as a thumbnail or a list within the displayed picture of the former content 400A.

Afterwards, referring to FIG. 11 (c), if the thumbnail displayed within the picture of the text content 400A is selected, the controller 180 switches the picture of the text content 400A to the picture of the image content 400B corresponding to the selected thumbnail.

Figure 12:
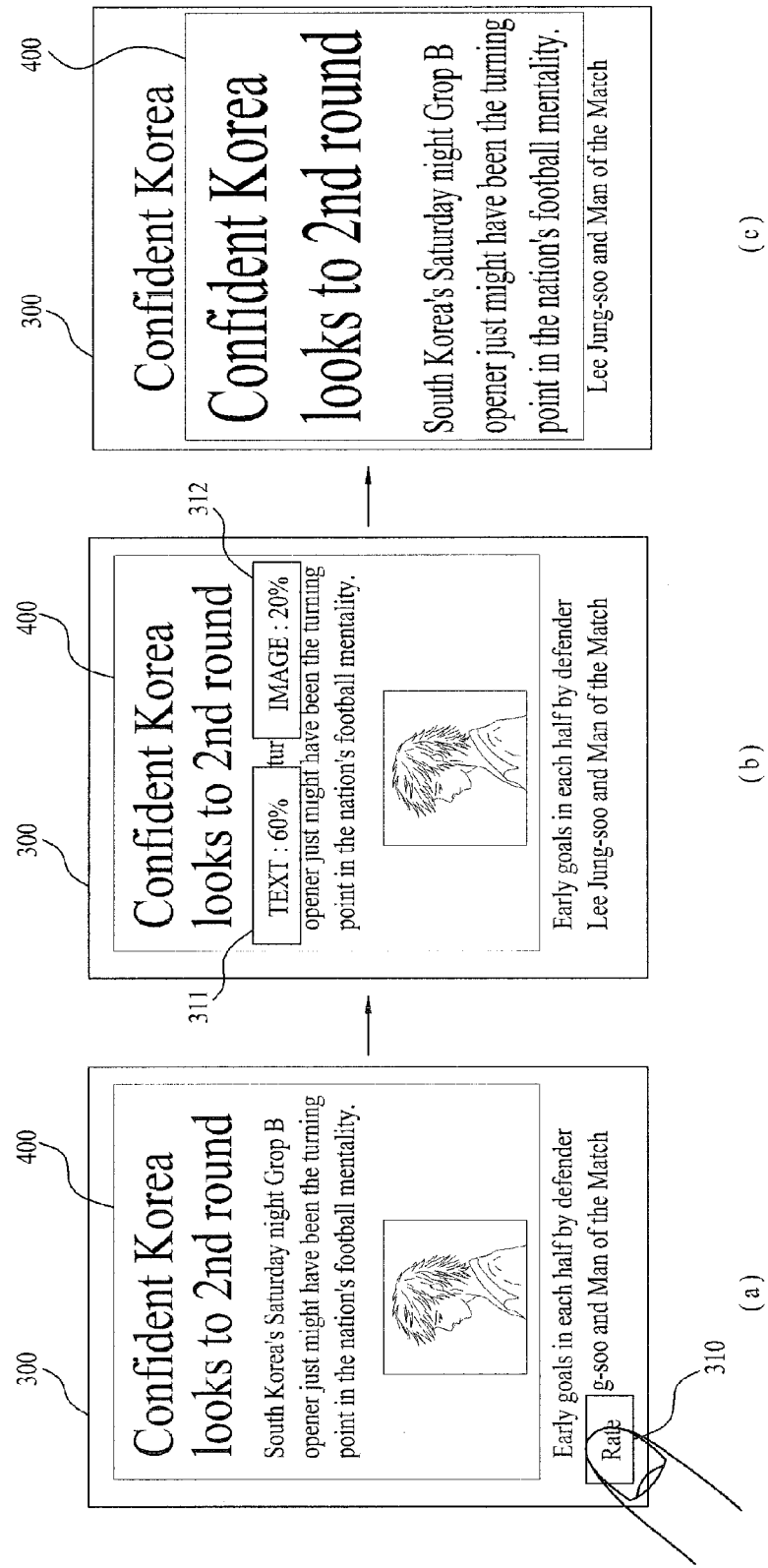
Figure 13:
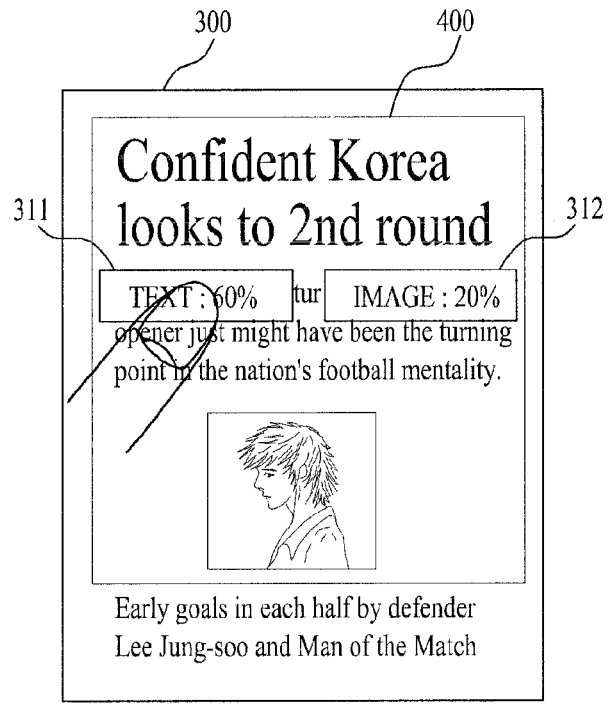
Figure 13:

Referring to FIG. 12 (a), if a specific region 400 is specified within the website picture 300 by a user, the controller 180 is able to display a UI object 310 for calculating display rates of contents in the region 400 before extracting and displaying the content having a highest display rate among the contents include din the region 400.

If the UI object 310 for the display rate calculation is selected by a user, the controller 180 calculates the display rates of the contents in the region 400, displays information 311 and 312 on the calculated display rates off the contents [FIG. 12 (b)], and then displays the content having the highest display rate within the region 400 [FIG. 12 (c)].

In this case, referring to FIG. 12 (b), text content and image content are displayed within the region 400, with the text content 400A having a display rate of 60% and the image content 400B having a display rate of 20% within the region 400. A user is informed of such information via the display rate information 311 and 312.

According to a selection of the display rate information 311 and 312, the corresponding content is extracted and displayed within the region 400. In particular, while the display rate information 311 and 312 is displayed, if the display rate information 311 of the text content 400A is selected [FIG. 13 (a)], the controller 180 extracts and displays the text content 400A corresponding to the selected display rate information 311 within the region 400 irrespective of size of the display rate within the region 400 [FIG. 13 (b)].

Figure 14:
Figure 14:
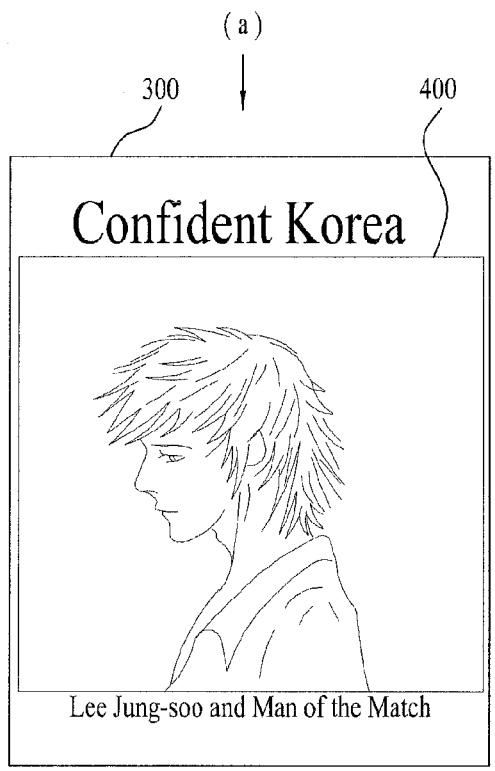

Moreover, while the display rate information 311 and 312 is displayed, if the display rate information 312 of the image content 400B is selected [FIG. 14 (a)], the controller 180 extracts and displays the image content 400B corresponding to the selected display rate information 312 within the region 400 irrespective of size of the display rate within the region 400 [FIG. 14 (b)].

Figure 15:
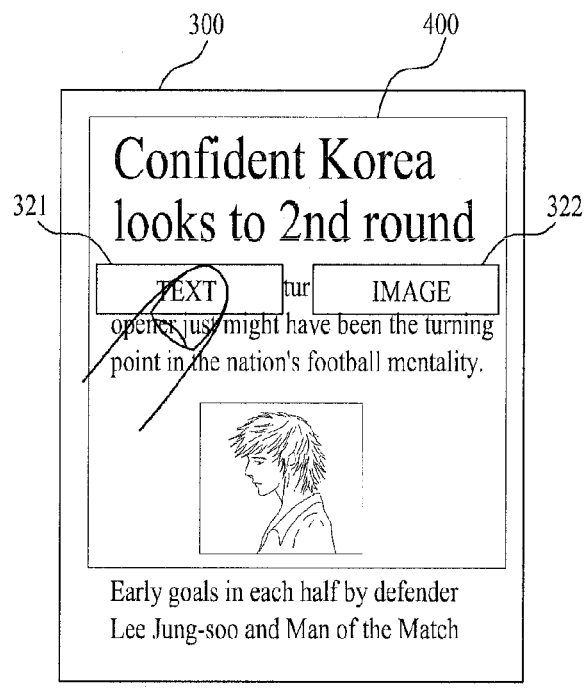
Figure 15:
Figure 16:
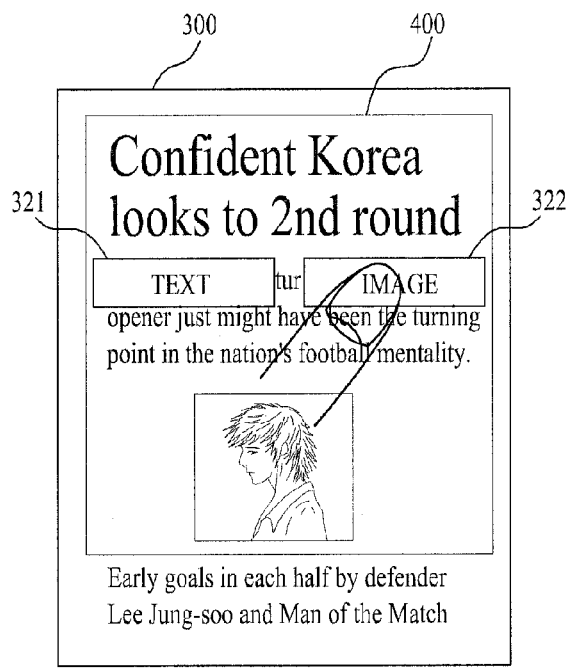
Figure 16:
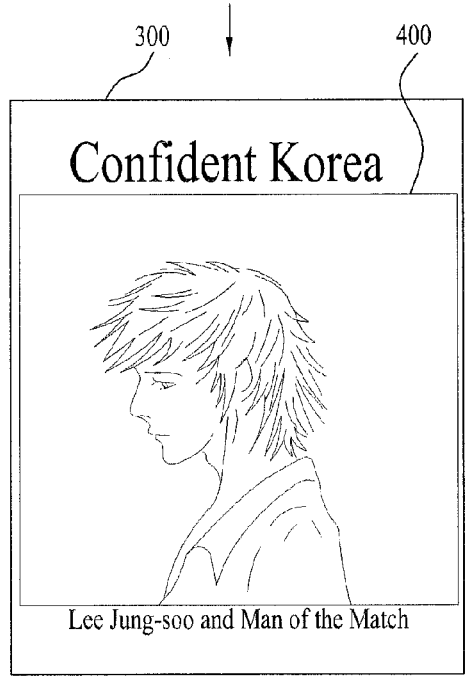

Referring to FIGS. 15 and 16, the controller 180 obtains and displays types of contents included in the region 400 without the steps S140 and S150. If a user selects a specific content type, the controller 180 extracts and displays the content corresponding to the selected type within the region only.

Referring to FIG. 15 (a), the controller 180 displays information 321 indicating that text content 400A is included in the region 400 specified by a user and information 322 that image content 400 is included in the region 400. If the text-type information 321 is selected from the content-type information 321 and 322, referring to FIG. 15 (b), the controller 180 extracts and displays the selected text-type information within region 400 only.

On the other hand, if the image-type information 322 is selected from the content-type information 321 and 32 [FIG. 16 (a)], the controller 180 extracts and displays the selected image-type information within the region 400 only [FIG. 16 (b)].

Figure 17:
Figure 17:
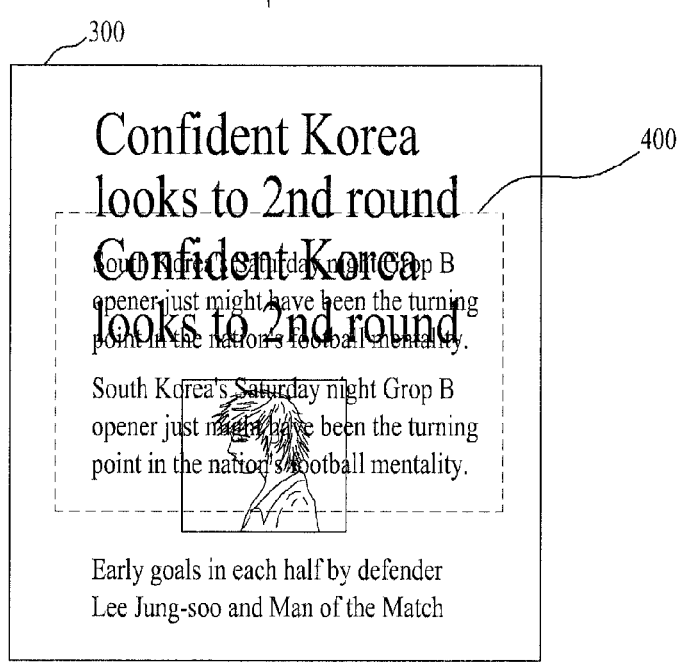

Referring to FIGS. 17 (a) and 17 (b), in case of displaying the content 400A extracted within the region 400 as a popup window on the website picture 300, the controller 180 transparently displays the substance of the corresponding content, whereby both of the website picture 300 and the content 400A can be seen.

In this case, a user is able to adjust the transparency of the content 400A. In particular, in case of displaying the content substance transparently, the controller 180 provides a user with an interface for adjusting the transparency of the content within the popup window. Therefore, the user is able to adjust the transparency by manipulating the interface.

Figure 18:
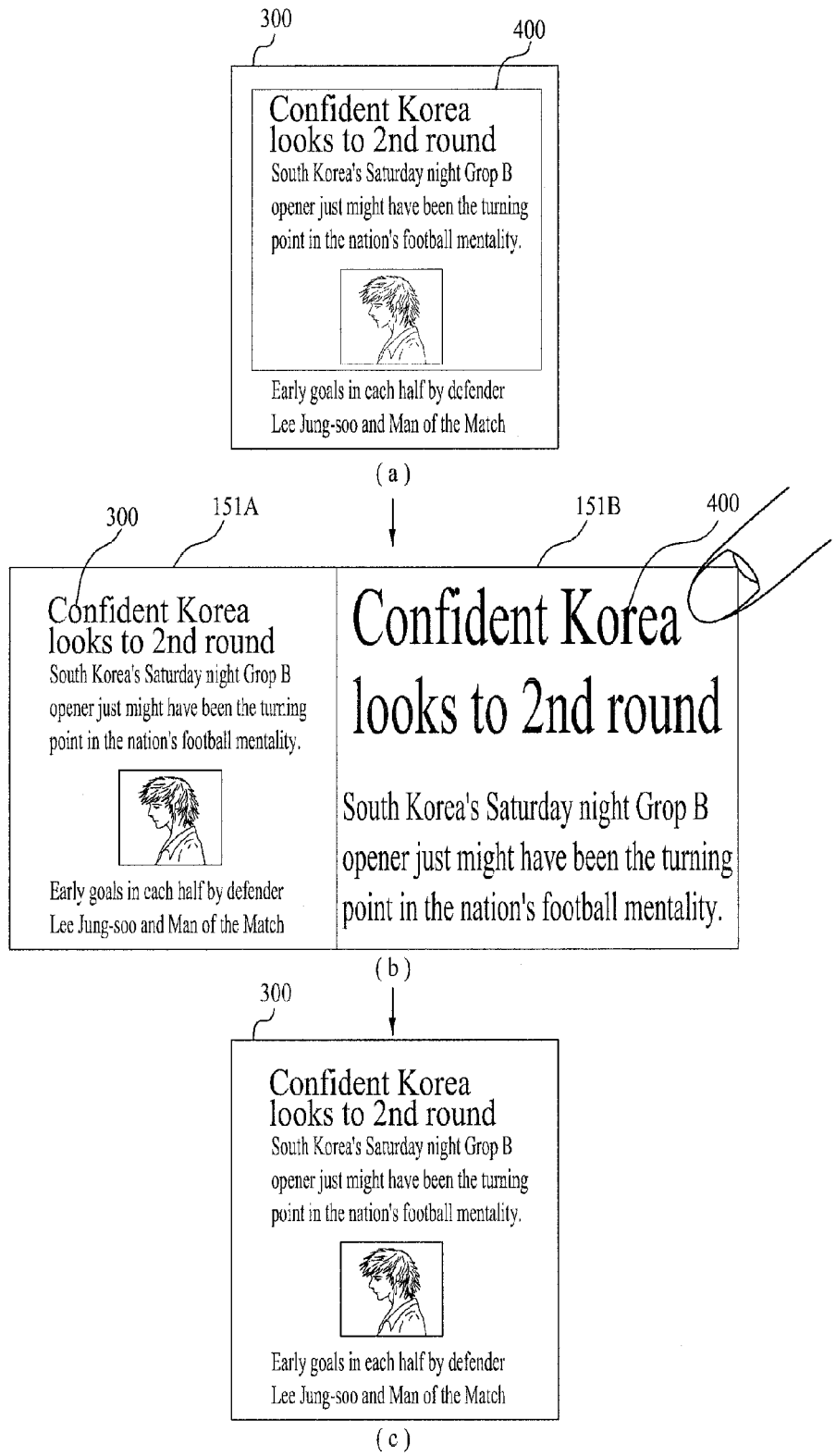
Figure 19:
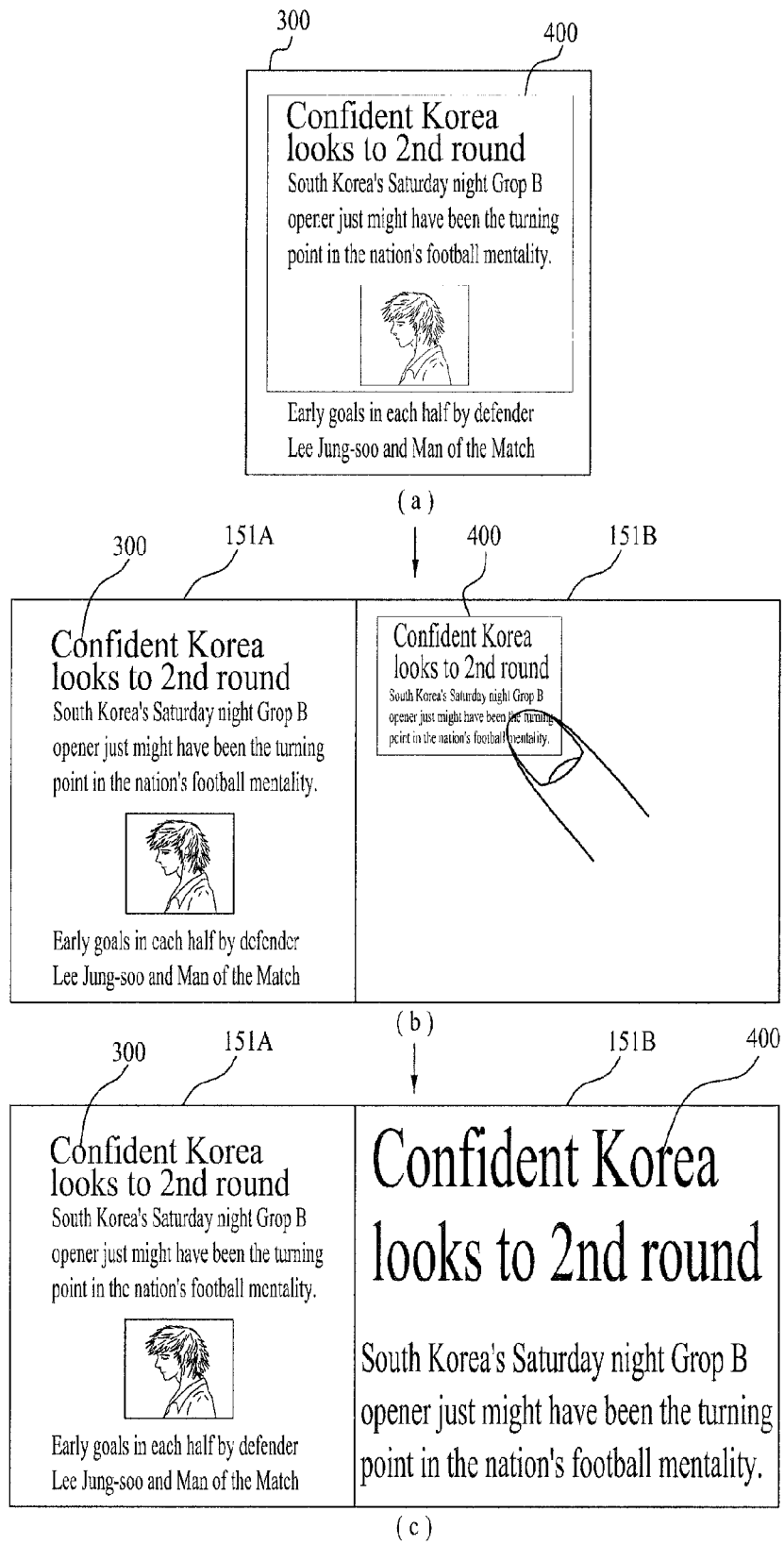
Figure 20:
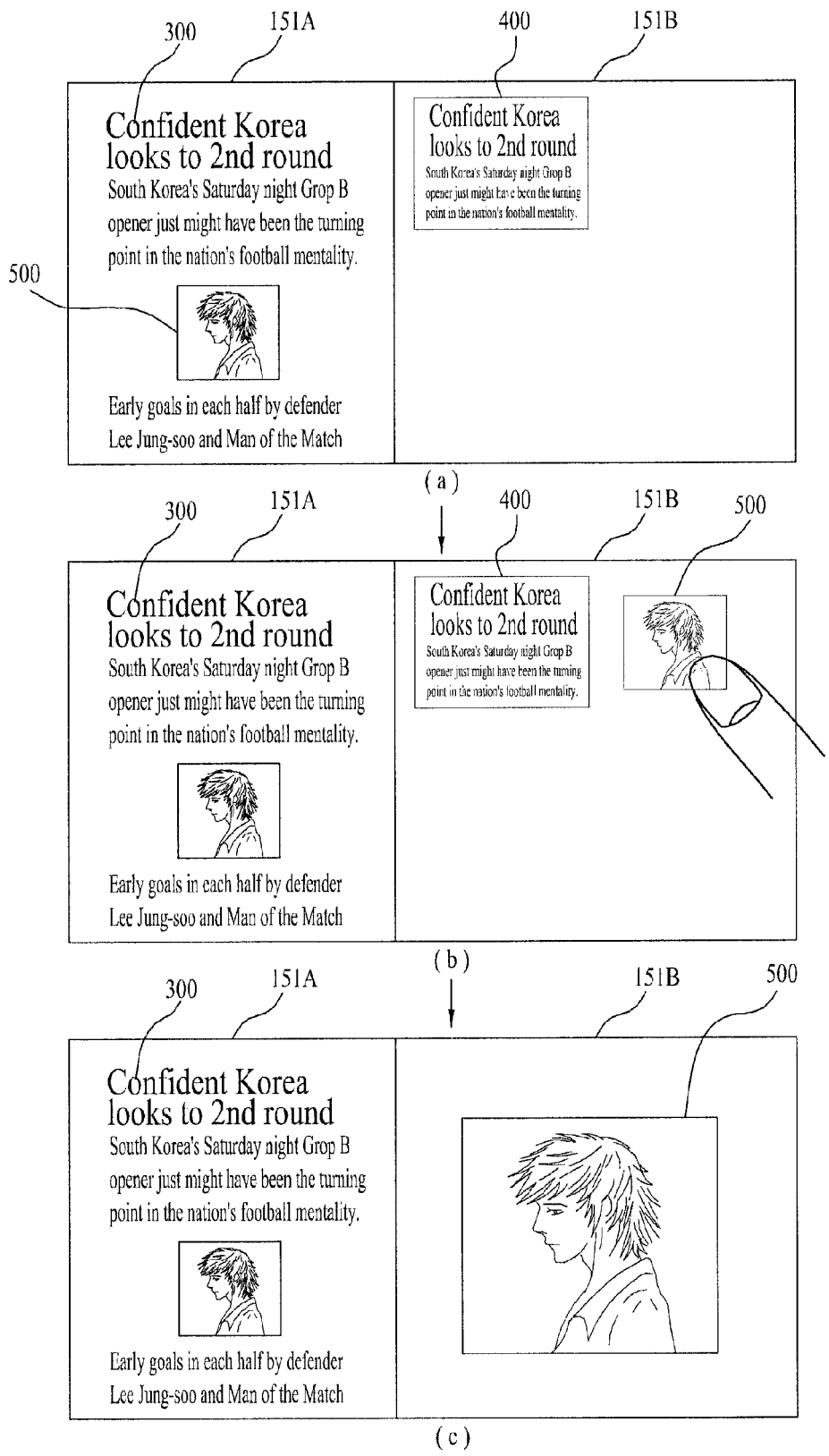

Referring to FIGS. 18 to 20, the controller 180 divides the website picture 300 into a first region 151A and a second region 151B and is then displays the extracted content on one of the first or second regions 151A and 151B.

More specifically, if a specific region 400 is specified within the website picture 300, the controller 180 searches the contents included within the region 400 for text content 400A having a highest display rate [FIG. 18 (a)]. Once the text content 400A having the highest display rate is searched, the controller 180 divides the screen of the touch screen 151 into first region 151A and second region 151B [FIG. 18 (b)].

The controller 180 then displays the website picture 300 in the first region 151A and extracts and displays the text content 400A searched within the region 400 on the second region 151B.

The controller 180 may divide the screen of the touch screen 151 into the first region 151A and the second region 151B according to user's manipulation. For instance, if a user performs a drag touch on the touch screen 151 to partition the screen into different regions, the controller 180 divides the screen of touch screen 151 into the first region 151A and the second region 151B according to the user's drag touch.

While the screen of the touch screen 151 is divided into the first region 151A and the second region 151B, if the user touches the region to display the text content 400A thereon, the controller 180 displays the text content 400A on the region touched by the user and is able to display the website picture 300 on the other region.

Meanwhile, while the website picture 300 and the text content 400A are displayed on the first region 151A and the second region 151B, respectively, if a user selects the text content 400A [FIG. 18 (b)], the controller 180 stops displaying the text content 400A and enables the screen of the touch screen 151 divided into the first and second regions 151A and 151B to return to the screen shown in FIG. 18 (a) prior to the initial division [FIG. 18 (c)].

In case of displaying the corresponding content within the second region 151B, the controller 180 displays the content on the whole second region 151B by zooming in the corresponding content, as shown in FIG. 18, or is able to display the content as a thumbnail image, as shown in FIG. 19 or FIG. 20.

In particular, if a specific region 400 is specified within the website picture 300 [FIG. 19 (a)], the controller 180 divides the screen of the touch screen 151 into a first region 151A and a second region 151B and then displays the website picture 300 on the first region 151A [FIG. 19 (b)].

The controller 180 searches the region 400 for a text content 400A having a highest display rate, generates the searched text content 400A as a thumbnail image, and then displays the corresponding thumbnail image on the second region 151B [FIG. 19 (b)].

In this case, the thumbnail image 400A may be displayed in a manner that the whole text content 400A is reduced or zoomed out and the text content 400A can be partially displayed. In this case, the partially displayed text content 400A can include an initial text within the text content 400A.

Meanwhile, if the thumbnail image 400A is selected by a user [FIG. 19 (b)], the controller 180 can display the text content 400A corresponding to the thumbnail image 400A on the whole second region 151B in a manner of zooming in or enlarging the corresponding text content 400A [FIG. 19 (c)].

While the thumbnail image 400A shown in FIG. 19 (b) is displayed within the second region 151B, if a user additionally specifies another region 500 on the website picture 300 within the first region 151A [FIG. 20 (a)], the controller 180 searches the additionally specified region 500 for an image content 400B occupying a highest display rate, generates the searched image content 400E into a thumbnail image, and is then able to additionally display the thumbnail image 400B on the second region 151B [FIG. 20 (b)].

In this case, the thumbnail image 400B may be displayed in a manner that the whole image content 400B is zoomed out or reduced. And, meta information of the image content 400B can be displayed. The meta information includes such information of the image content 400B as a file format, a created date, a file size and the like of the image content 400B.

Meanwhile, if a user selects the thumbnail image 400B, the controller 180 [FIG. 20(b)], the controller 180 is able to display the image content 400B corresponding to the thumbnail image 400B on the whole second region 151B in a manner of zooming in or enlarging the image content 400B [FIG. 20 (c)].

Figure 21:
Figure 21:
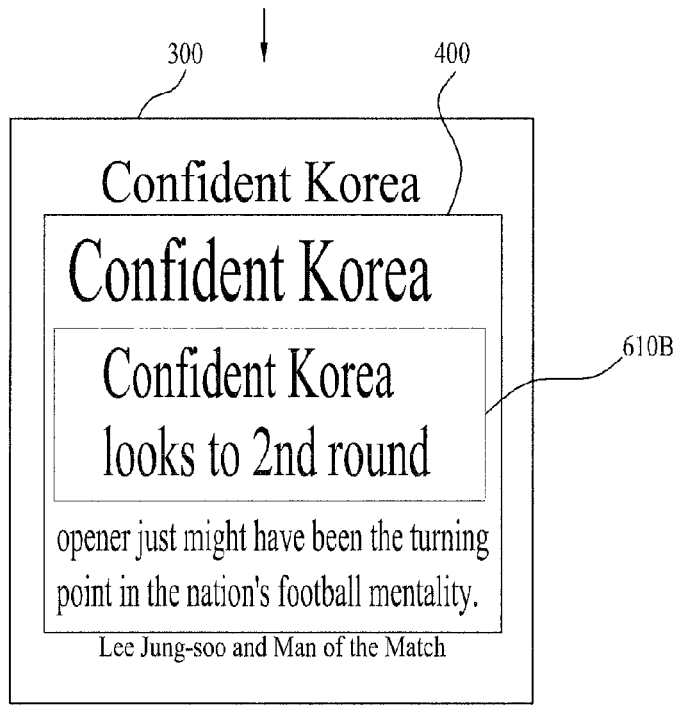

FIG. 21 (a) shows a case that the controller 180 extracts the text content 400A occupying the highest display rate within the region 300 by the process shown in FIG. 8 (b) and displays the extracted content 400A on a new window.

In particular, if at least one text 610A is specified within the text content 400A [FIG. 21 (a)], the controller 180 extracts the specified text 610A within the text content 400A and is able to display the extracted text 610A in a manner of zooming in or enlarging the extracted text 610A on the whole screen or displaying the extracted text 610A as a popup window. In this case, FIG. 21 (a) shows one example that the specified at least one text 610A is a sentence.

Figure 22:
Figure 22:
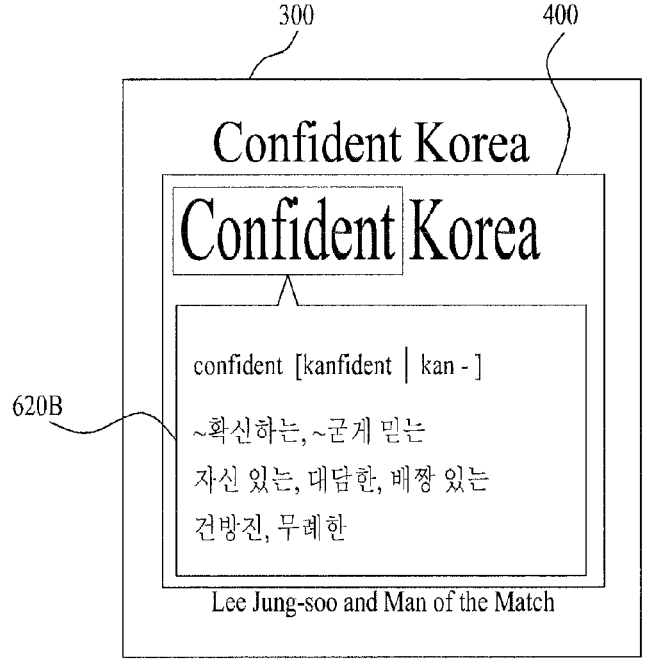
Figure 23:
Figure 23:
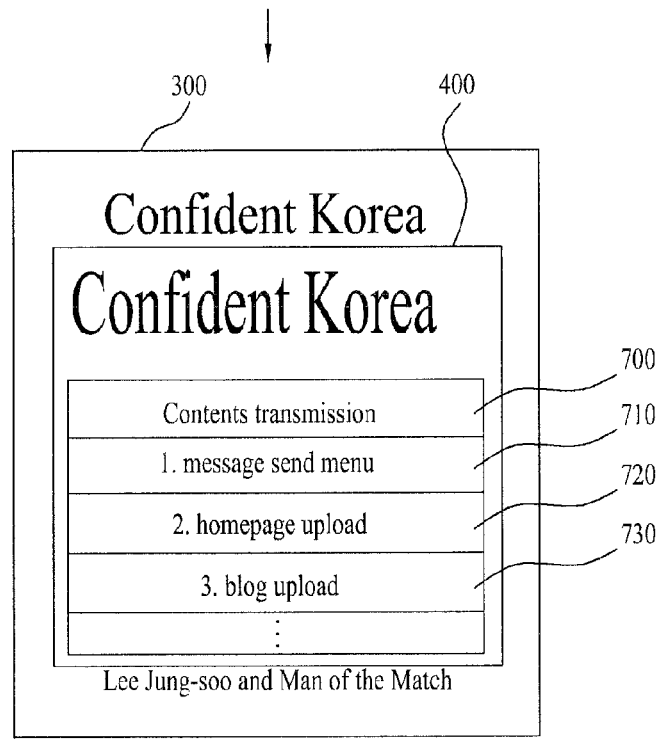

FIG. 22 (a) shows a case that the controller 180 extracts the text content 400A occupying the highest display rate within the region 300 by the process shown in FIG. 8 (b) and displays the extracted content 400A on a new window.

If a specific text 620A is specified within the text content 400A [FIG. 22(a)], the controller 180 searches an electronic dictionary provided to the memory 160 for information 620B related to the specified text 520A and then displays the searched information 620B [FIG. 22(b)].

Alternatively, the controller 180 is able to search the information 620B related to the specified text 620A via a preset website and then displays the searched information 620B.

In particular, once the text 620A is specified, the controller 180 accesses the preset website via the wireless communication unit 110, searches the information 620B related to the text 620A by inputting the specified text 620A to the website, and is then able to display the searched information 620B.

Referring to FIGS. 23 to 26, the controller 180 externally transmits content 400A occupying a highest rate in region 300 via the wireless communication unit 110.

In particular, FIG. 23(a) shows a case that the controller 180 extracts the text content 400A occupying the highest rate within the region 300 by the process shown in FIG. 7(b) and displays the extracted content 400A as a popup window.

Referring to FIG. 23(b), if a menu for transmitting the text content 400A externally is selected or the text content 400A is selected, the controller 180 displays a menu list 700 for transmitting the text content 400A.

More particularly, FIG. 23(b) shows that the menu list 700 includes a message send menu 710, a homepage upload menu 720 and a blog upload menu 730, by which types of the menu list 700 of the present invention are non-limited. For instance, an email send menu and the like can be further included in the menu list 700. Namely, all menu functions for transmitting content 400A can be included in the menu list 700.

Figure 24:
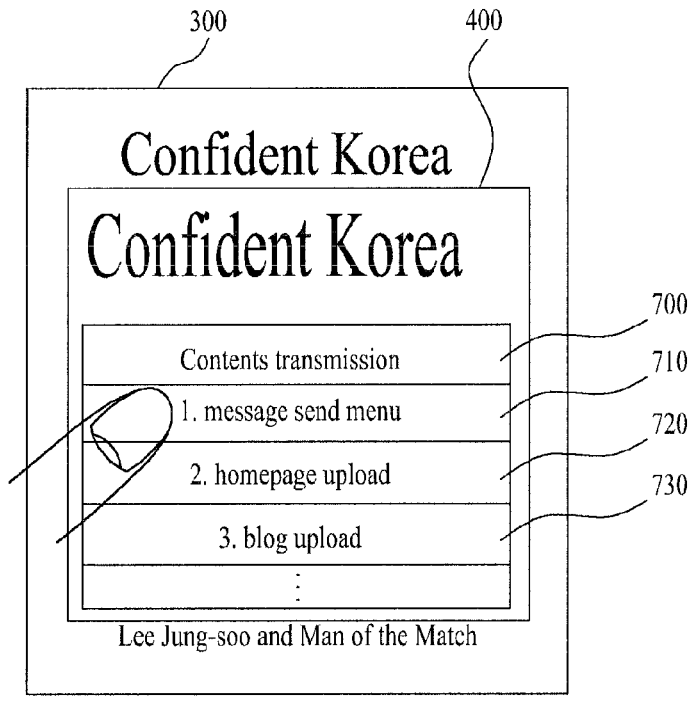
Figure 24:
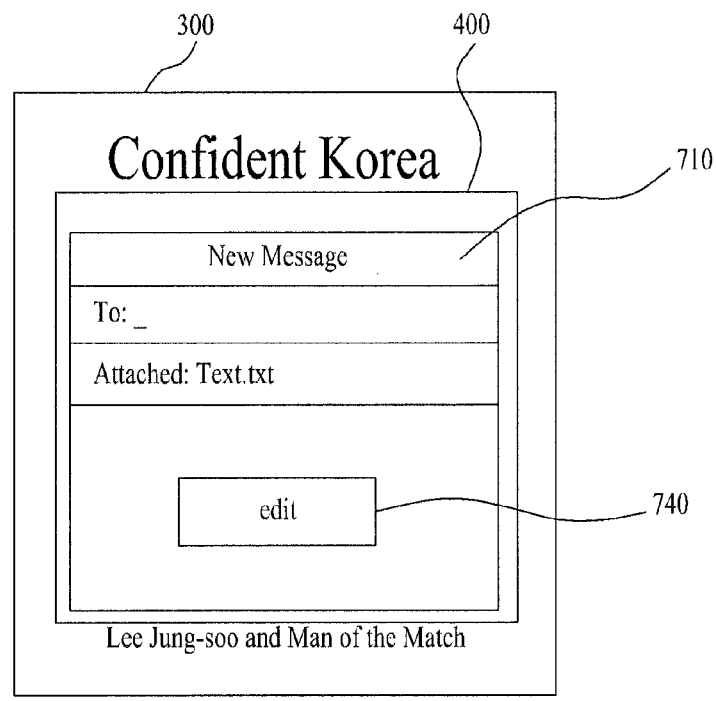
Figure 25:
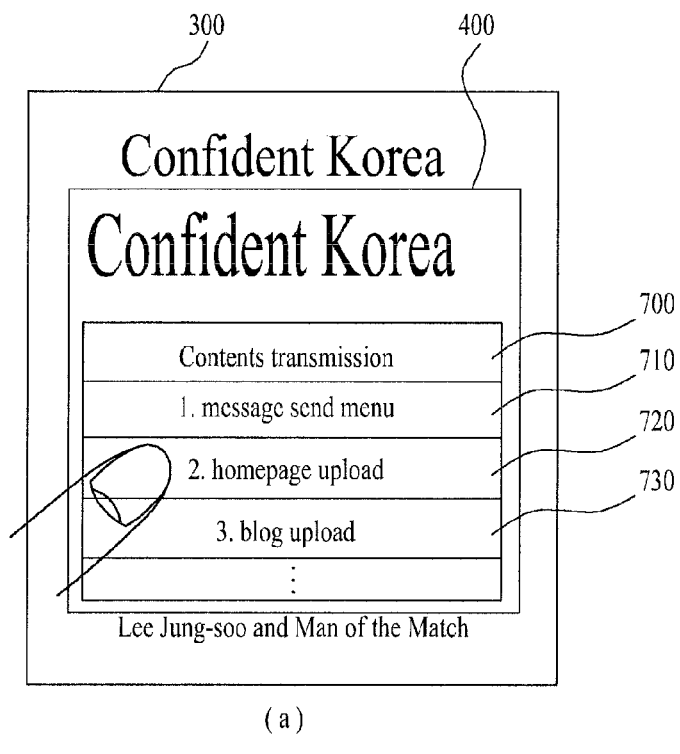
Figure 25:
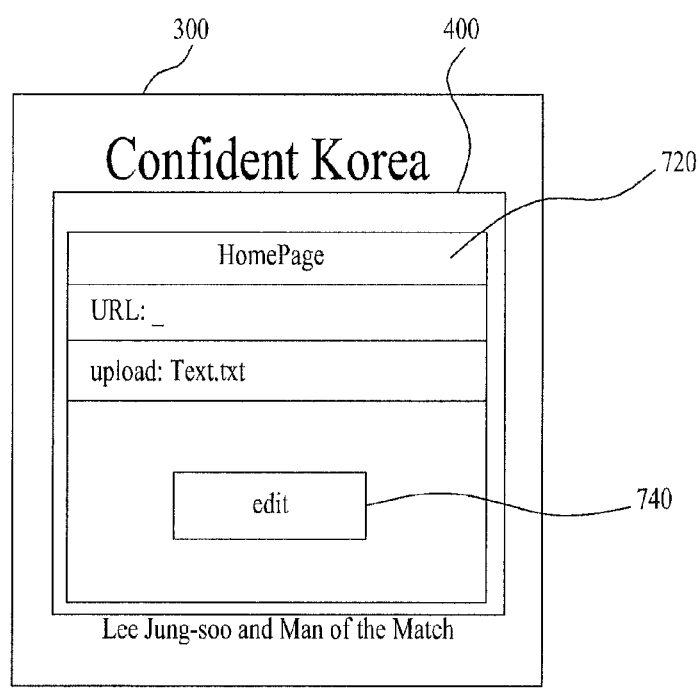
Figure 26:
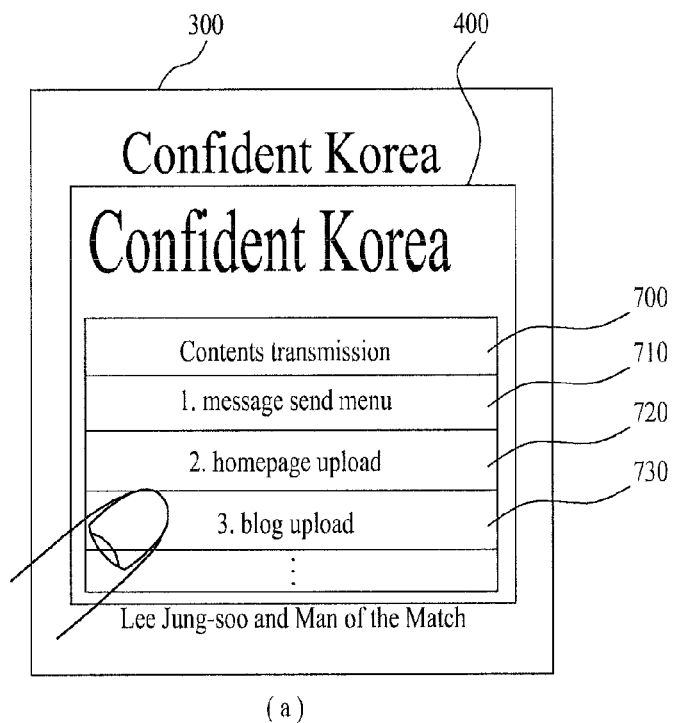
Figure 26:
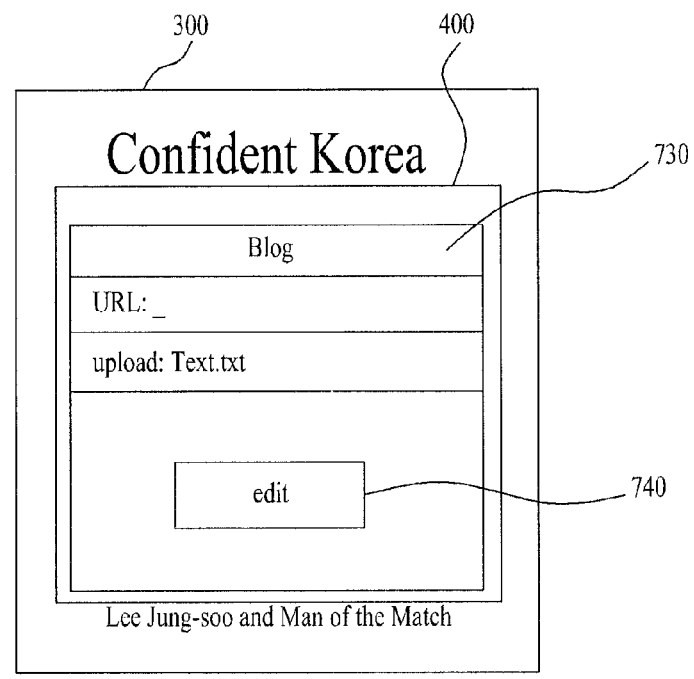

If the message send menu 710 is selected from the menu list 700 shown in FIG. 23(b) [FIG. 24 (a)], the controller 180 displays a message write window and then attaches the text content 400A within the message write window [FIG. 24(b)].

Afterwards, if a recipient of the message is set by a user, a message having the text content 400A attached thereto is sent to the set recipient via the wireless communication unit 110.

If a menu 740 for editing the text content 400A is selected before attaching the text content 400A within the message write window, the controller 180 displays an editing function in relation to a window that provides a plurality of editing functions.

The editing function providing window may include all editing functions loaded on a generally used paint plate, an image edit tool or the like. A user may edit content to be sent to a recipient via the editing function providing window or may combine the corresponding content with the formerly stored contents by the step S160. Once editing of the content is completed, the editing-completed content is transmitted to the recipient by being attached to the message write window.

If the homepage upload menu 720 is selected from the menu list 700 shown in FIG. 23(b) [FIG. 25(a)], the controller 180 displays a homepage access window and then attaches the text content 400A to upload within the homepage access window [FIG. 25(b)].

Afterwards, if a user inputs an address of the homepage to access, the homepage is accessed via the wireless communication unit 110. The text content 400A is then uploaded to the accessed homepage.

If a menu 740 for editing the text content 400A is selected before uploading the text content 400A to the homepage, the controller 180 displays an editing function providing window for providing a plurality of editing functions.

Afterwards, a user edits a content to upload to the homepage via the editing function providing window or combines the corresponding content with the formerly stored contents by the step S160. Once the editing of the content is completed, the editing-completed content is uploaded to the homepage.

If the blog upload menu 730 is selected from the menu list 700 shown in FIG. 23(b) [FIG. 26(a)], the controller 180 displays a blog access window and then attaches the text content 400A to upload within the blog access window [FIG. 26(b)].

Afterwards, if a user inputs an address of the blog to access, the blog is accessed via the wireless communication unit 110. The text content 400A is then uploaded to the accessed blog.

If a menu 740 for editing the text content 400A is selected before uploading the text content 400A to the blog, the controller 180 displays an editing function providing window for providing a plurality of editing functions.

Afterwards, a user edits a content to upload to the blog via the editing function providing window or combines the corresponding content with the formerly stored contents by the step S160. Once the editing of the content is completed, the editing-completed content is uploaded to the blog.

Accordingly, one or more embodiments presented herein may have one or more of the following advantages, First, according to at least one of embodiment, once a region to view is specified within a picture including a plurality of contents therein, content occupying a highest rate within the specified region is extracted and displayed. Therefore, this embodiment facilitates a user to view a specific content on a current picture.

In addition, the method embodiments may be implemented in a program recording medium as computer-readable code. The computer-readable media may include all kinds of recording devices in which data readable by a computer system are stored, including ROM, RAM, CD-ROM, magnetic tapes, floppy discs, optical data storage devices, or the like for example, and also carrier-wave type implementations (e.g., transmission via Internet). The computer can include the controller 180 of the terminal.

One or more embodiments also provide a mobile terminal and controlling method thereof, wherein if a region to view within a screen having a plurality of contents is specified, the content having a highest rate within the specified region may be extracted and displayed in a variety of ways.

According to one embodiment, a method of controlling a mobile terminal includes of displaying a picture including a plurality of contents, specifying a specific region on the picture, extracting the content occupying a highest rate among a plurality of the contents included in the region, and displaying the extracted content.

As used herein, the words 'module', 'unit' and 'part' are used for elements in order to facilitate the disclosure only. Therefore, significant meanings or roles are not given to the suffixes themselves and it is understood that the 'module', 'unit' and 'part' can be used together or interchangeably. Also, the terms "rate" or "display rate" may correspond to the proportion of contents displayed on the screen, wherein the proportion may be measured, for example, in terms of data size or physical size occupied on the screen.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with the other embodiments described herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display screen displaying a plurality of information within a first prescribed area of the display screen, the information containing first data of first type and second data of second type, and the first and second types being different; and
   a controller to control the information being displayed on the display screen, wherein upon receiving a selection of first data provided within a second prescribed area of the first prescribed area and second data provided within a third prescribed area of the first prescribed area and when the second prescribed area is greater than the third prescribed area, the controller expands a viewable size of the selected first data such that the selected first data is viewable in a fourth prescribed area of the first prescribe area, the fourth prescribed area being greater than the second prescribed area.

2. The mobile terminal of claim 1, the fourth prescribed area is a pop-up window, which overlays the second and third prescribed areas, and is provided within the first prescribed area.

3. The mobile terminal of claim 2, wherein the fourth prescribed area is smaller than the first prescribed area.

4. The mobile terminal of claim 1, wherein the first data of first type is text and the second data of the second type is image.

5. The mobile terminal of claim 1, wherein the second data is not displayed on the display screen.

6. The mobile terminal of claim 1, wherein the first prescribed area is greater than a sum of the second prescribed area and the third prescribed area.

7. A mobile terminal comprising:
- a display screen displaying a plurality of information within a first prescribed area of the display screen, the information containing first data of first type and second data of second type, and the first and second types being different; and
- a controller to control the information being displayed on the display screen, wherein upon receiving a selection of first data provided within a second prescribed area of the first prescribed area and second data provided within a third prescribed area of the first prescribed area and when the second prescribed area is greater than the third area, the controller expands a viewable size of the first data type such that the selected first data is viewable in a fourth prescribed area of the first prescribe area, the fourth prescribed area being greater than the second prescribed area, wherein an information of the second data is displayed within the fourth prescribed area.

8. The mobile terminal of claim 7, the fourth prescribed area is a pop-up window which overlays the second and third prescribed areas.

9. The mobile terminal of claim 8, wherein the fourth prescribed area is smaller than the first prescribed area.

10. The mobile terminal of claim 7, wherein the fourth prescribed area is at least equal to the first prescribed area.

11. The mobile terminal of claim 7, wherein the first data of first type is text and the second data of the second type is image.

12. The mobile terminal of claim 7, wherein the information of the second data is provided in a fifth prescribed area within the fourth prescribed area.

13. The mobile terminal of claim 12, wherein the fifth prescribed area is equal to the third prescribed area.

14. The mobile terminal of claim 12, wherein the information of the second data is provided as a thumbnail image or as a list within the fifth prescribed area.

15. The mobile terminal of claim 12, wherein upon selection of information in the fifth prescribed area, the controller changes the information displayed in the first prescribed area to the second data by expanding a viewable size of the second data and the first data is not displayed.

16. A method of operating a mobile terminal comprising:
- displaying a plurality of information within a first prescribed area of a display screen, the information containing first data of first type and second data of second type, and the first and second types being different;
- selecting first data displayed within a second prescribed area of the first prescribed area and second data provided within a third prescribed area of the first prescribed area; and
- expanding a viewable size of the selected first data when the second prescribed area is greater than the third prescribed area such that the selected first data is viewable in a fourth prescribed area of the first prescribe area, the fourth prescribed area being greater than the second prescribed area.

17. The method of claim 16, wherein the expanding step comprises displaying a pop-up window overlaying the second and third prescribed areas, the pop-up window having the fourth prescribed area provided within the first prescribed area.

18. The method of claim 16, wherein the second data is not displayed on the display screen.

19. The method of claim 16, wherein the first prescribed area is greater than a sum of the second prescribed area and the third prescribed area.

20. The method of claim 16, further comprising displaying a thumbnail image or a list corresponding to the second data in a fifth prescribed area within the fourth prescribed area, the fifth prescribed area being no greater than the third prescribe area.

21. The method of claim 20 further comprising:
- selecting the thumbnail image or the list in the fifth prescribed area; and
- changing the information displayed in the first prescribed area to the second data by a pop-up window displaying the second data with an expanded viewable size.

* * * * *